June 27, 1939.  W. OWEN  2,164,077
GLASS HANDLING APPARATUS
Filed July 19, 1938   8 Sheets-Sheet 6

INVENTOR.
WILLIAM OWEN
BY
ATTORNEYS.

June 27, 1939.  W. OWEN  2,164,077

GLASS HANDLING APPARATUS

Filed July 19, 1938  8 Sheets-Sheet 7

INVENTOR.
WILLIAM OWEN
BY
ATTORNEYS.

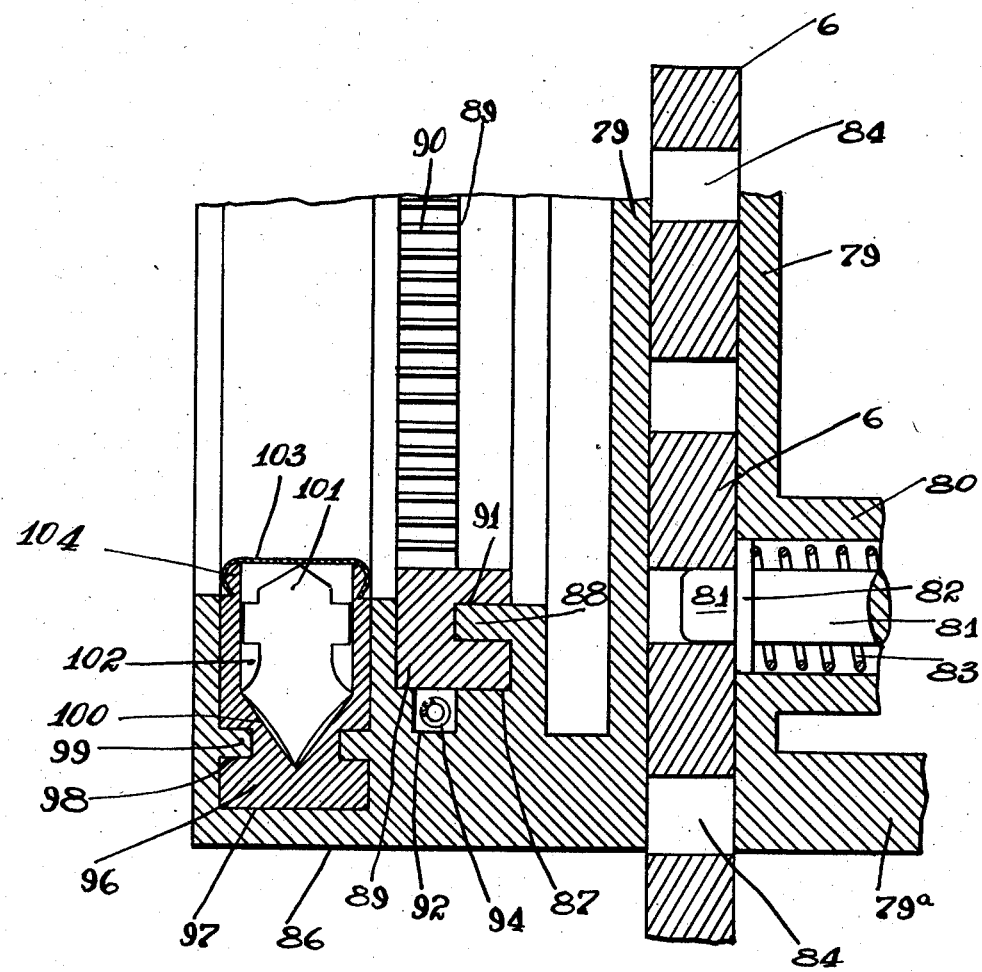

Patented June 27, 1939

2,164,077

UNITED STATES PATENT OFFICE 2,164,077

GLASS HANDLING APPARATUS

William Owen, Pittsburgh, Pa., assignor to Pittsburgh Plate Glass Company, Allegheny County, Pa., a corporation of Pennsylvania Application July 19, 1938, Serial No. 220,052

17 Claims. (Cl. 216—1)

The present invention relates to glass handling apparatus and more particularly to a mechanism for inserting protective separators between, and applying identification markers to, stacked sheets of glass preliminary to packaging therein for shipping.

One object of the invention is to provide apparatus which will automatically and systematically separate sheets of glass in a stack and insert spacer papers between the sheets.

A second object of the invention is to provide apparatus of the foregoing type which will automatically apply adhesive labels to the sheets of glass.

Other objects and advantages of my invention will become more apparent from the following detailed description of one embodiment thereof.

In packaging of glass sheets or plates such as window glass or the like, for shipment or storage, it is common practice to insert sheets of paper between the contacting surfaces in order to prevent chemical or physical damage which sometimes occurs when glass contacts with glass. Likewise, it is common practice to stick labels or other indicia to the glass in order to identify its origin or for other purposes.

These operations have heretofore been performed manually and since millions of sheets were to be so treated it will be apparent that much labor was involved in performing them.

In the construction constituting the present invention an intermittently moving conveyor system upon which sheets of glass can be stacked on edge is provided. Mechanism is also provided automatically to lift each sheet upwardly and then to swing it away from the stack while a label is affixed thereto and a sheet of paper is inserted between it and the stack.

For a better understanding of the invention reference may now be had to the drawings in which like numerals refer to like parts.

Figure 11 is a fragmentary cross-sectional view substantially upon the line XI—XI of Figure 3;

Figure 1:
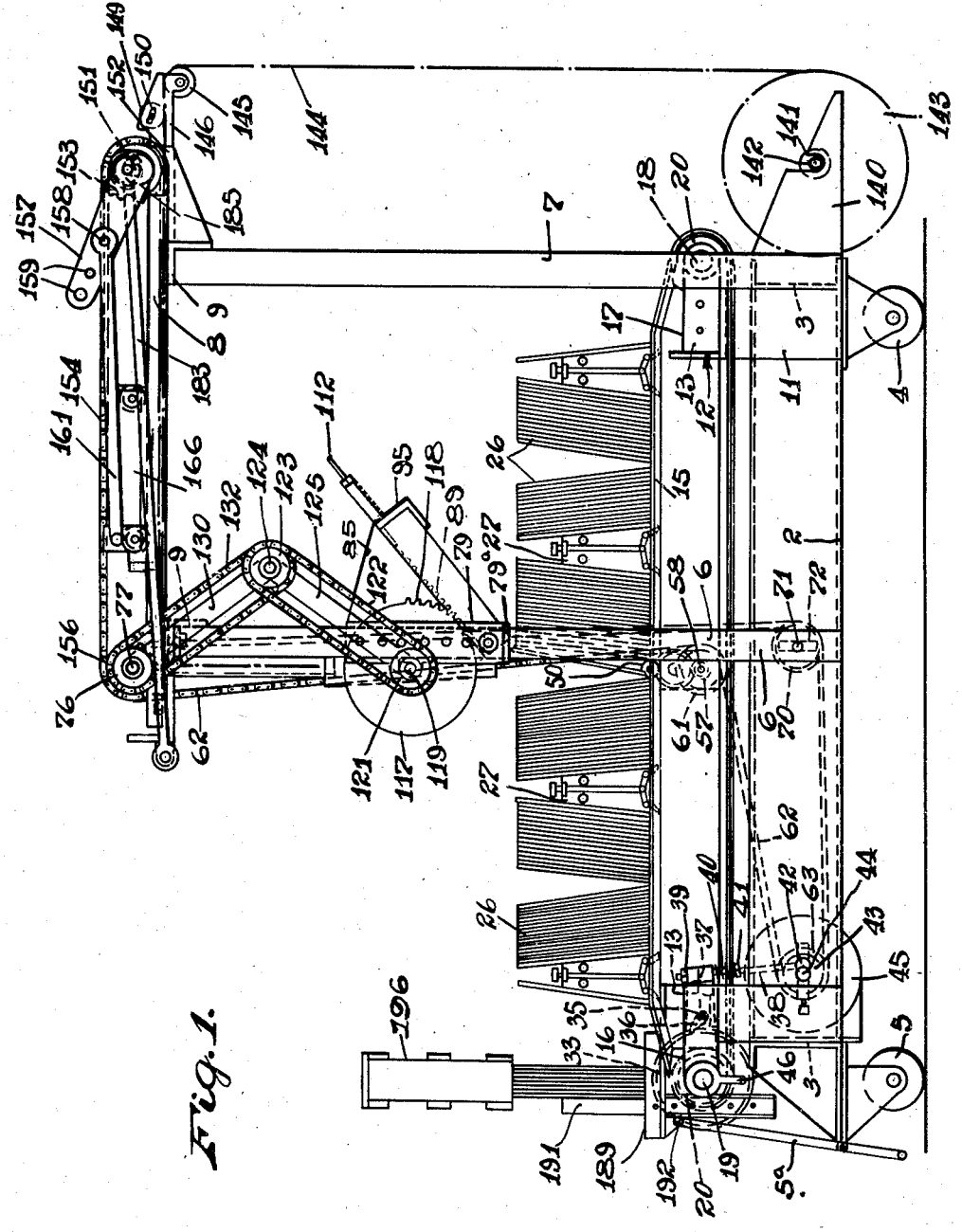
Figure 1 is a side elevational view of an apparatus constructed in accordance with the invention.

As shown in Figure 1, the apparatus comprises longitudinal beams 2 which are interconnected by transverse beams 3 to provide a frame that is supported upon fixed castors 4, and swivelling front castor 5, the latter of which is provided with a pivoted handle bar 5a, by means of which the apparatus may be drawn about.

The framework further comprises two pairs of vertical supports, the forward pair 6 of which is secured to intermediate portions of beams 2 while the rearward pair 7 is secured adjacent to the rear extremities of the same beams. At their upper extremities, these supports are interconnected by longitudinal bars or rails 8 and transverse angle bars 9. The bars 8, as shown, are horizontal, but if preferred may be downwardly inclined at any desired angle.

A second set of supports comprising plates 11 are secured to the beams 2 at each corner of the framework and are transversely interconnected by angle bars 12. Sides 13 of the bars are suitably notched to receive a plurality, e. g., four horizontal guide rails 15.

Figure 9:
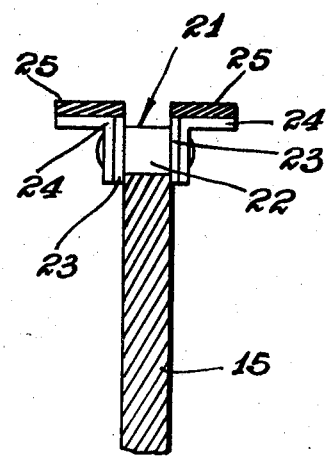
Figure 9 is a fragmentary cross-sectional view taken through one of the conveyors for the glass plates.

Longitudinally projecting brackets 16 and 17 are secured to sides of rails 15 and constitute bearings for transverse shafts 18 and 19 which carry a series of sprocket gears 20 (shown in Figure 1) at the ends of rails 15. Conveyor chains 21 are trained about the sprockets and comprise rollers 22 (shown in Fig. 9) that ride upon said rails. The rollers are connected together by links 23 having brackets 24, that carry covering strips or belts 25 of rubber or similar flexible cushioning material. These belts carry sheets of glass 26 stacked in upwardly inclined position.

Figure 3:
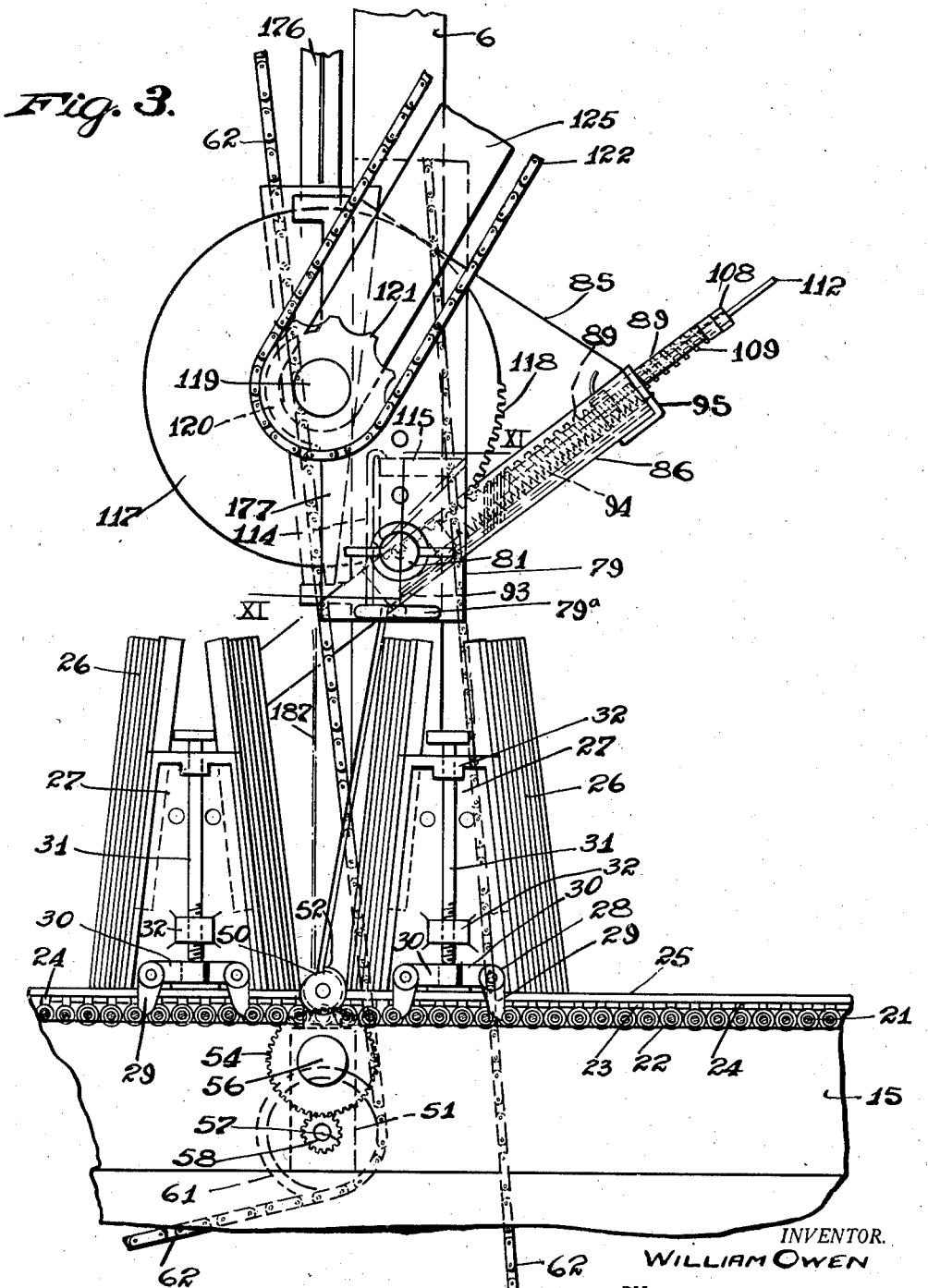
Figure 3 is a fragmentary side elevational view on an enlarged scale of the conveyor and stamping mechanism embodied in the invention.

The plates are supported in inclined position upon the conveyors by means of blocks 27 (best shown in Fig. 3). These blocks may be locked upon the chains by means of a pair of bell-crank levers 28 pivoted thereto and having downwardly directed arms 29 that may engage rollers 22 between belts 25. Arms 30 of the levers overlap each other and may be simultaneously operated to actuate the arms 29 into engagement with the rollers by means of a screw 31 threaded through lugs 32 upon the blocks.

Figure 2:
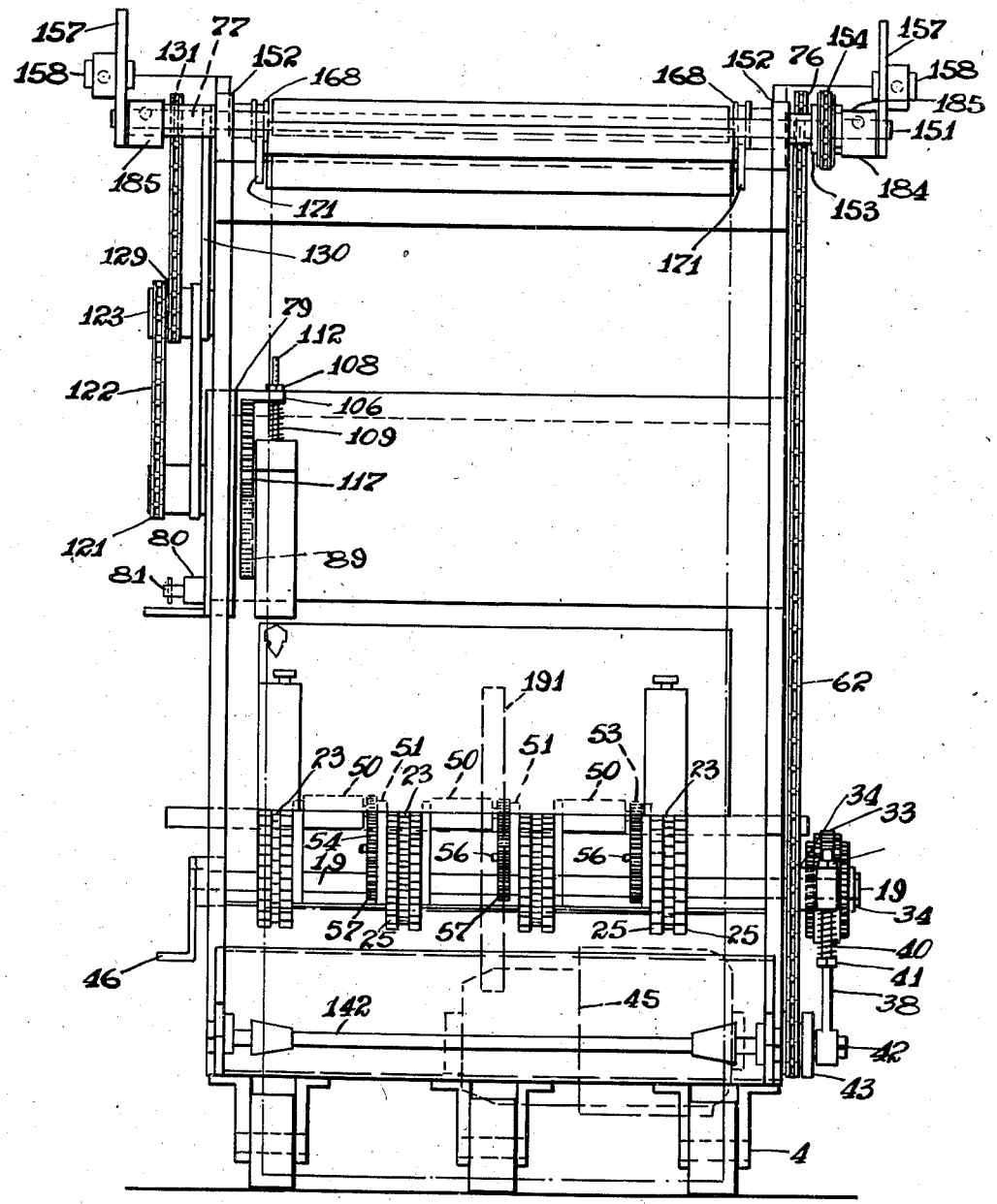
Figure 2 is an end elevational view thereof.
Figure 10:
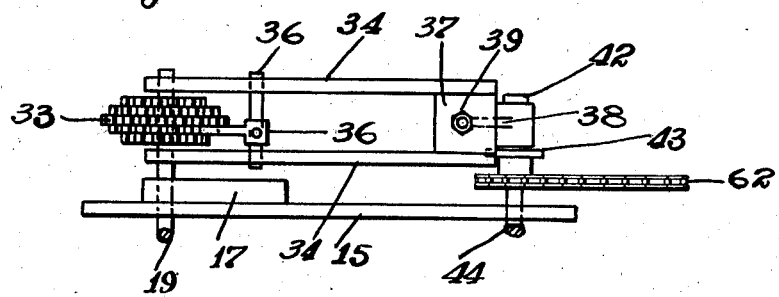
Figure 10 is a fragmentary detailed view of a mechanism for actuating the conveyor.

Motion is intermittently transmitted to the conveyor chains by a mechanism which includes (as shown in Figs. 1, 2 and 10) a cluster 33 of gears of different pitch diameters keyed upon shaft 19. A pair of arms 34, best shown in Fig. 10, are also journaled upon the shaft upon opposite sides of the cluster and are interconnected by a shaft 35 upon which is pivoted a pawl 36 which may be adjusted transversely upon the shaft to engage any gear surface in the cluster.

A block 37 is disposed between the arms at the extremities thereof and is bored slidably to receive a downwardly extending rod 38. This rod is yieldably held from movement in the block by a nut 39 adjacent to its upper extremity and by a helical spring 40 which at its upper extremity engages the lower surface of block 37 and its lower extremity engages a collar 41 upon rod 38. Preferably the hole or opening in block 37 is of such size as to permit of considerable play of the rod 38. At its lower extremity the rod is journaled upon the pin 42 of a crank 43 which is keyed upon the extremity of the output shaft 44 (shown in Fig. 1) of a combined motor and speed reducing unit 45, which unit is mounted upon beam 3. Manual activation of the shaft 19 in order rapidly to advance the conveyor chains 21 may also be effected by means of a crank 46.

Mechanism for consecutively separating from the stack the sheets of glass resting upon their edges upon the conveyor chains 22 comprise rollers 50 (shown in Figs. 2 and 3), journaled in bearing brackets 51 which are secured upon the sides of rails 15. Each roller is provided with a flute or toe 52 (shown in Fig. 3) preferably of rubber or similar material adapted successively to engage and raise the lower edges of glass sheets or plates in the stack. The rollers are also provided at their extremities with gears 53 (shown in Fig. 2), which engage gears 54 upon studs 56 which project from the brackets 51. The latter gears are driven by pinions 57 keyed upon a shaft 58, which in turn is journaled in bearings in brackets 51.

As shown in Figure 1 the shaft 58 is provided with a sprocket gear 61 which is engaged by a sprocket chain 62, the latter being trained about a sprocket gear 63, upon the shaft 44 of power unit 45. The sprocket chain is further trained about idler gear 70 upon a shaft 71 which operates in slots 72 in uprights 6, and extends upwardly about a sprocket gear 76 upon the extremity of a shaft 77 having bearings 78 (shown in Fig. 5), mounted upon bar 8 which interconnects members 6 and 7. The function of this shaft will be described in greater detail later.

Mechanism for pushing the upper edge or plates 26 away from the stack, to admit of application of a label and to admit of the insertion of sheets of paper as separators between the plates will now be described. It comprises a sleeve-like slide 79, shown in Fig. 4, mounted upon the upright 6 opposite to chain 62 and is provided with handle 79a by means of which it may be raised or lowered. This sleeve may be locked at a predetermined position upon the upright by a latch comprising a housing 80, secured thereupon and bored slidably to receive a latch pin 81. The pin is provided with a collar 82 and a helical spring 83 coiled about the pin and engaging the collar at one end and engaging the inner face of the housing at the other end actuates the pin into engagement with a selected opening 84 in the support 6, to hold the sleeve at a desired height thereupon.

The slide, as shown in Figs. 1 and 3, is provided upon its inner face with a rearwardly directed web 85 having an upwardly inclined ledge 86 along its lower edge. In the ledge, as shown in Fig. 11, is formed a longitudinal groove 87 of L-shaped cross-sectional contour to provide an overhanging lip 88. In the grooves is slidably disposed a rack bar 89 having teeth 90 and being formed with a longitudinal groove 91 that receives lip 88. The bottom portion of the groove is rabbeted as indicated at 92 to receive a lip 93 upon the lower extremity of the rack bar and helical spring 94 under tension is attached thereto at its lower end. At its upper end the spring is attached to a bracket 95 which is secured across the upper end of the groove 87, and resiliently urges the rack bar rearwardly to retracted position.

A magazine slide 96 is disposed in a second guideway 97 in ledge 86 in parallelism to rack bar 89 and is operatively connected thereto by means to be described later. The magazine is formed with longitudinal grooves 98 interlocking with lateral ribs 99 in the guideway. The slide is longitudinally grooved as indicated at 100 to receive adhesive labels 101, which are retained therein by inwardly-directed fingers 102 (shown in Figs. 7 and 8), that partially close the lower end thereof. The top of the magazine is closed by a cover 103 clipped over edge beads 104. In order to protect glass plates 26 from breakage by contact with the slide the lower end of the latter is, also, provided with rubber buffers 105.

Figure 4:
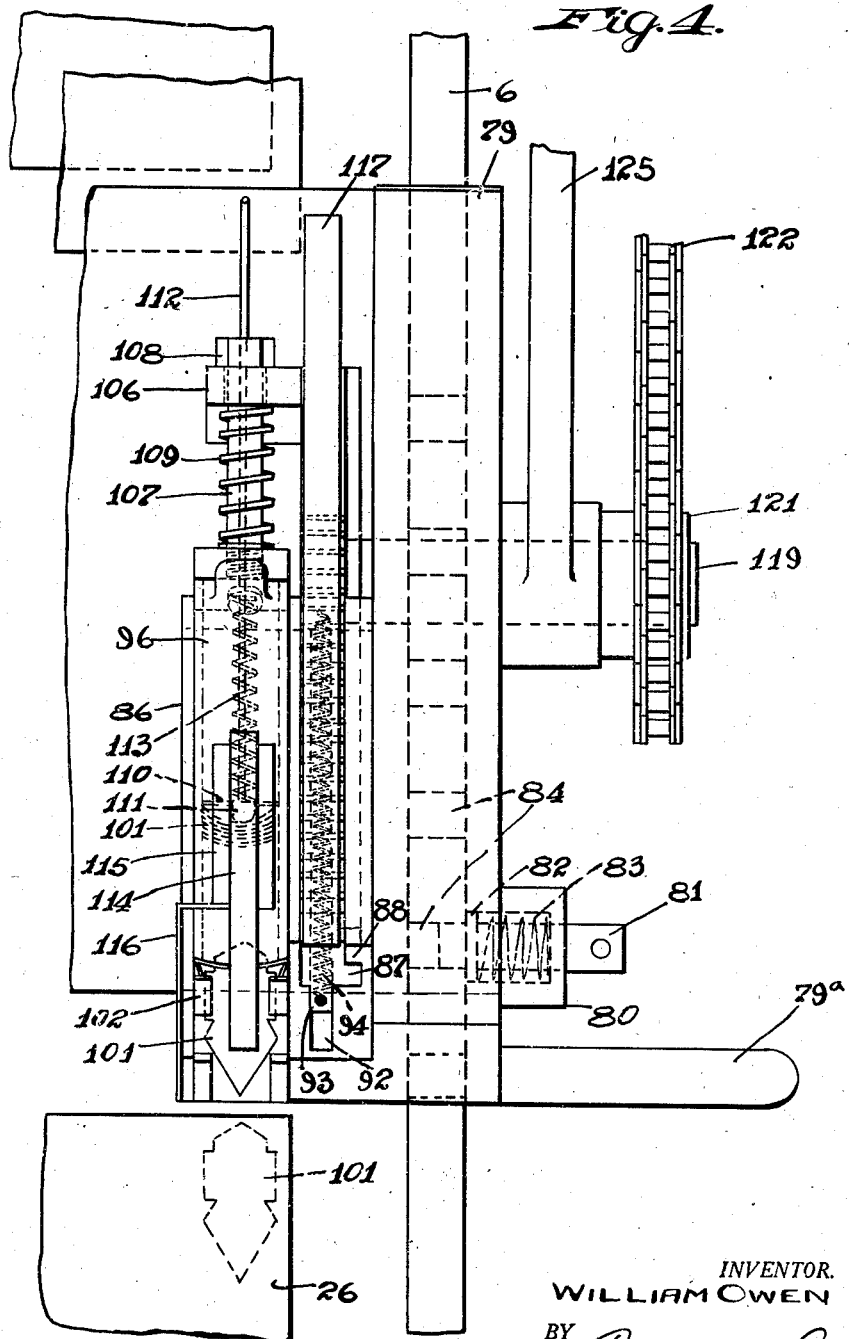
Figure 4 is a fragmentary front elevational view on a larger scale of the stamping mechanism.

As shown in Figure 4 the magazine slide is operatively connected to rack bar 89 by means of an arm 106 (Fig. 4) projecting laterally from the bar and bored slidably to receive a tubular rod 107 projecting rearwardly from the slide. A nut 108, threaded upon the extremity of the rod, provides a stop to prevent the complete displacement of the latter from the arm 106, and is held yieldably in contact with the arm by a helical spring 109 coiled about the rod and engaging at opposite ends with the arm and the upper end of slide 96.

Figure 7:
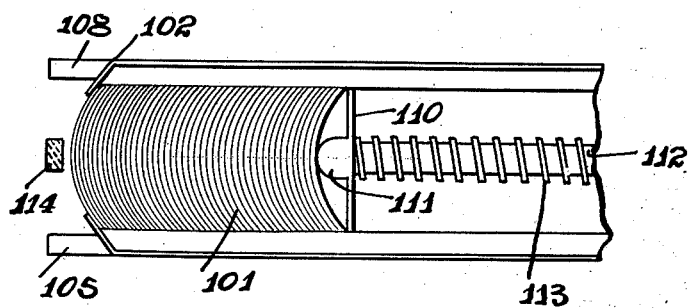
Figure 8:
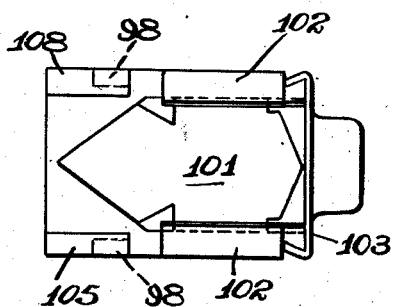

Adhesive labels 101 are (as shown in Figs. 4 and 7) actuated downwardly by means of a follower 110 having a boss 111 which tends to bend the mid portions of the labels outwardly in position more readily to contact with the plates of glass. The follower is provided with a rearwardly-extending guide rod 112 which extends outwardly through the tubular rod 107 and a helical spring 113 coiled about the guide rod presses the follower downwardly. Moistening of the gum upon the label in order to make it adhesive is accomplished by a wick 114 of suitable material which hanges from a reservoir 115 for water, supported upon a bracket 116 which is secured to ledge 86.

Actuation of rack bar 89 to cause the magazine 96 to travel downwardly to push the top of a plate 26 away from stack of unlabeled plates is effected by a segmental gear 117, best shown in Figs. 1, 3 and 4, the toothed sector 118 of which, as the gear rotates, periodically engages the rack bar 89. This gear is fixed upon a shaft 119 which is journaled in a bearing 120 (shown in Fig. 3), upon slide 79. The shaft is provided with a sprocket gear 121 about which drive chain 122 is trained. The latter is further trained about a sprocket gear 123 journaled upon a stud shaft 124, which shaft is secured in the upper end of a link 125, that is journaled upon shaft 119.

A driving connection for shaft 124 and gear 123, operable when slide 70 is in any desired position, is obtained by provision of mechanism including a second sprocket 129 integral with the sprocket 123. The mechanism further comprises a link 130 journaled upon the shaft 124 at its lower end and journaled at its upper end upon driven shaft 77 previously described. The latter shaft is also provided with a sprocket 131 and a sprocket chain 132 trained about it and gear 129 transmits power to actuate segmental gear 117.

Figure 5:
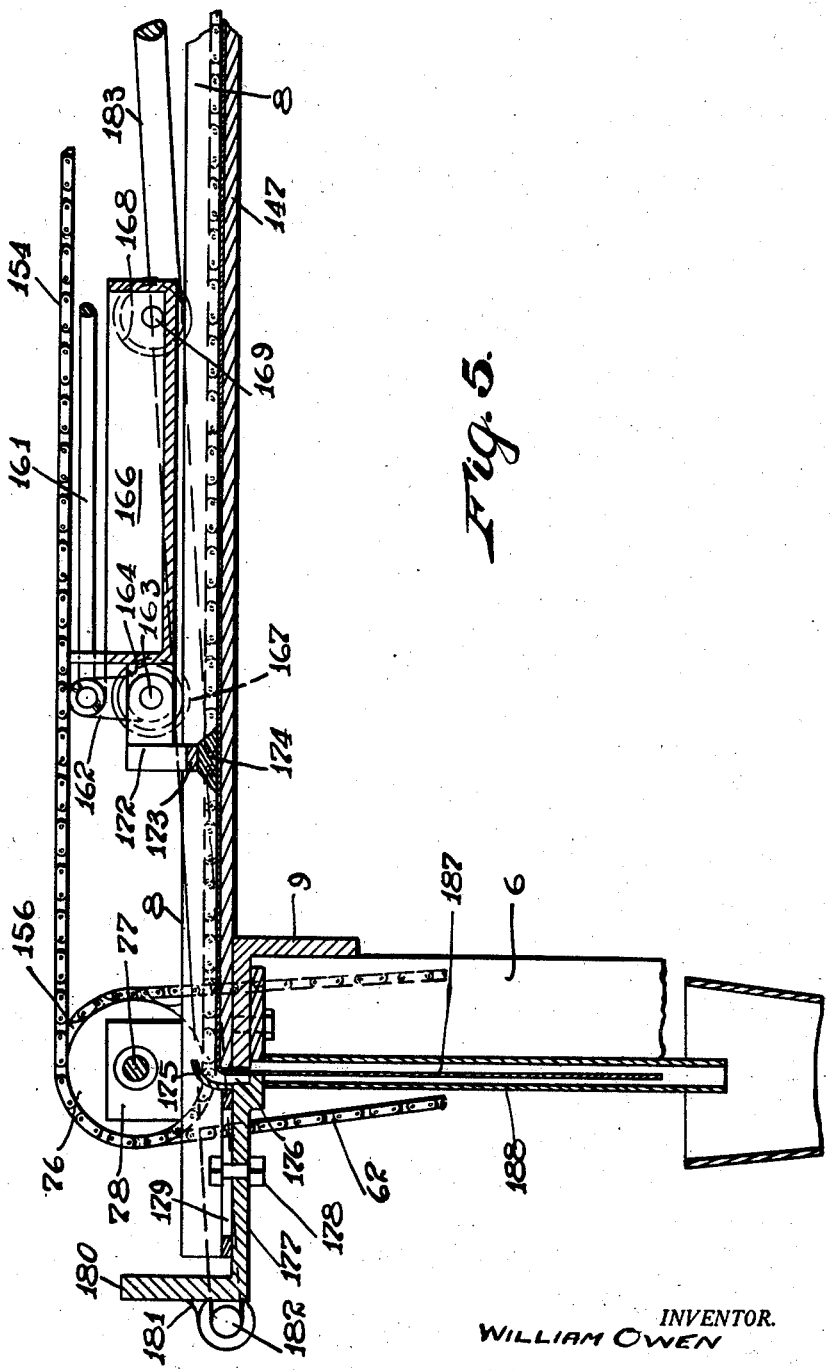
Figure 5 is a fragmentary sectional view of the paper-feeding apparatus.
Figure 6:
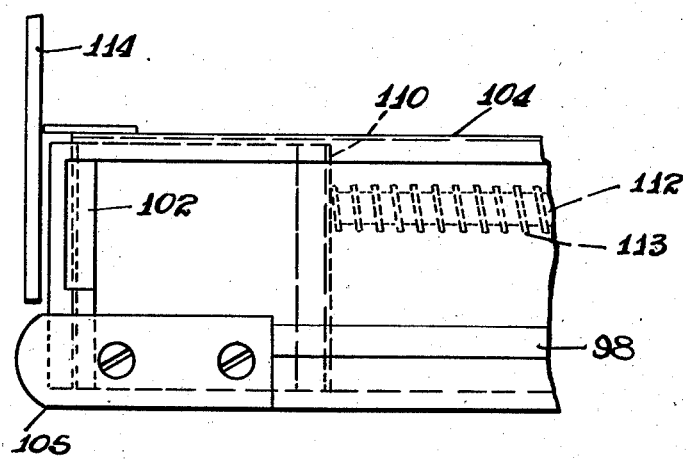
Figures 6, 7 and 8 are fragmentary detailed views of a combined label magazine and label affixing device.

Mechanism to feed paper between the sheets or plates of glass comprises brackets 140 extending rearwardly from beams 2 and provided with notches 141 constituting bearings for the shaft 142 of a roll of paper 143. A web 144 from the roll is fed upwardly over an idler roller 145 which is journaled in brackets 146 extending rearwardly from rear transverse beam 9. As shown in Figure 5, a deck 147 is supported upon beams 9 and the paper after passing over the roller is supported thereupon. Retraction of the paper is prevented by a roller 149 (see Fig. 1) journaled in rearwardly-inclined slots 150 in brackets 146 in such manner that a rearward pull upon the paper causes the roller 149 to travel backwardly and downwardly to exert a pressure against the deck, which pressure is proportional to the pull exerted.

The paper is intermittently fed forward in steps synchronous with the separation of the sheets of glass, by a mechanism that includes a shaft 151, journaled in bearings 152 adjacent to the rear ends of beams 8. This shaft near one extremity is provided with a sprocket gear 153, best shown in Fig. 1, which is driven by a sprocket chain 154 trained, in turn, about a sprocket 156 upon the extremity of driven shaft 77.

Crank arms 157 are secured upon the extremities of shaft 151 and are provided with crank pins 158, that can be secured in any preselected hole of a series 159, to obtain a desired throw. Pitman rods 161 are journaled at their rear extremities upon the pins and, as shown in Fig. 5, at their forward ends are pivoted to an arm 162. The latter is keyed upon a shaft 163, journaled to rotate in bearings in brackets 164 that project forwardly from a slide or car 166. Forward wheels 167 and rear wheels 168 are journaled respectively upon shaft 163 above described and upon a shaft 169 extending through the car. These wheels travel upon guide rails 8 over deck 147.

Shaft 163 is, also, provided with fixed arms 172, the extremities of which carry a bar 173 upon which is secured a foot 174 of rubber or other material adapted to lower to engage the paper web and push it forwardly as the car is pushed forwardly by pitman 161. During backward movement of the car the foot is raised from the paper. The paper is deflected downwardly by a curved guide plate 175 through a slot 176 in the deck 147.

Mechanism to sever pieces of paper from the web as it is advanced by the foot comprises a shear blade 177 secured for reciprocating movement beneath the forward edge of deck 147, by bolts 178, disposed in slots 179. The blade is provided at its forward edge with a bracket 180 having bearing 181 in which is secured a shaft 182 that projects at its ends beyond the sides of slide 166 to provide pintles for the forward ends of pitman rods 183. The rear extremities of the latter are provided with collars 184 (shown in Fig. 2) about eccentric portions 185 upon shaft 151.

Severed pieces 187 of paper are guided downwardly between the sheets of glass as they are separated, by means of a chute 188, secured beneath slot 176 in position to receive them as they drop.

Crating of the sheets of glass, after the paper separators have been inserted, may be effected upon a platform or table 189, secured by brackets (not shown) to rails 15. During the crating operation the sheets of glass are stacked upon their edges and preferably are set against a post 191 extending through an opening in the table. At its lower end the post operates in a guide 192 and may be secured in any desired position of adjustment by means of a pin that can be pushed in holes 194 formed in the post and the guide. The stack is received in crates 196.

Figure 12:
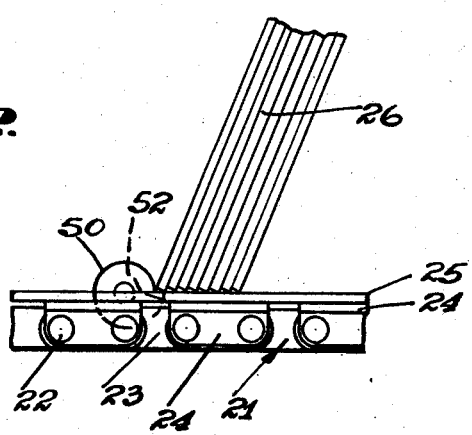
Figure 12 is a fragmentary detail view of a portion of one of the conveyors showing the lower edges of the plates of glass in position thereupon.

The mode of operation of the mechanism is simple. One or more of the blocks 27 are set at appropriate places on the chains 22 and sheets of glass are rearwardly inclined against the forward face of the block in such manner as to cause the lower edge of each sheet to project along its rear corner beyond the corresponding forward corner of the sheet immediately behind. This arrangement is best shown in Figure 12. When the edges are so disposed selective engagement with the toe or rib 52 upon roller 50 is facilitated. When the lower edge of the forward sheet of glass is in position to be engaged by the toe, the motor and speed reducing mechanism is started, thus driving chain 62 and causing roller 50 to rotate. The toe 52 engages the edge of the sheet first causing the sheet to slide upwardly slightly and then gradually swinging the lower edge to the position best shown in Figure 3.

This movement is particularly advantageous because it seems most effectively to break the cohesion between the plates produced by air pressure when there is a sudden force exerted to separate the plates. Such cohesion otherwise would offer serious difficulties, because it would tend to cause the plates to separate in groups.

When the plate reaches the position shown in Figure 3, the segmental gear 117, which is actuated in unison with rollers 50, by chains 62, 132 and 122, and their attendant sprockets, will engage rack 89. As the latter travels downwardly, the magazine 96 is carried forwardly by arm 106 and rod 107, to cause the front of label 101 to contact with moisture wick 114. The adhesive upon the latter is thus sufficiently softened that upon contact with the rear face of a glass plate it will adhere thereto.

Magazine 96 tips the upper edge of the plate 26 forward and causes the latter to fall against the rear side of a second block 27 disposed to receive it. The segmental gear 117, in the meantime rotates to release rack 89, the latter under the urge of spring 94 is retracted to retract the magazine preparatory to the next stroke.

It will be apparent that in the meantime the shaft 151 will be driven by chain 154 upon sprocket 156. The pitman rods 161 and 183 are thus reciprocated respectively to reciprocate sliding car 166 and shear blade 177. The foot upon the former functions to advance a predetermined length of paper which is then severed by the latter and drops down between the separated sheets of glass.

It will be evident that at each revolution of shaft 44 of the motor mechanism 45, the arm 34 is oscillated by connecting rod or pitman 38, to cause pawl 36 to engage and rotate gear 33 through a predetermined arc. Thus the conveyors for the glass sheets are advanced to bring the next sheet into position to be acted upon.

The simultaneous insertion of paper separators between, and the application of labels to the sheets of glass has been described. However, it will be apparent that one or the other of these operations may be omitted. Likewise, the use of chains and gears driven by single motor in order synchronously to operate the conveyor, the plate lifting and separating device, the lable affixing device, the paper feeding device and the paper cutting device have been described. It will be apparent that these various mechanisms could also be operated pneumatically or electrically by pistons or electrical solenoids, energization of which is effected in desired time sequence by revolving cams or other timing devices that open or close control valves or switches in the system.

The form of the invention herein illustrated is to be considered merely as illustrating the invention. Numerous modifications may be made therein without departure from the spirit of the invention or the scope of the following claims.

What I claim is:

1. A method of separating smooth plates arranged in face to face contact, which comprises supporting them upon their edges in upwardly inclined position, engaging the supporting edge of the foremost plate simultaneously to lift the plate and to swing the bottom thereof forwardly, then pushing the top portion of the plate forwardly away from the plate with which it contacts.

2. A method as defined in claim 1 in which a paper sheet is inserted between the plates as they are separated.

3. A process of inserting sheets of paper between plates of glass stacked in face to face contact, which comprises supporting the plates in stacked relation upon their lower edges in upwardly inclined position, consecutively tilting the upper edges thereof forwardly, feeding a continuous strip of paper forwardly severing separator sheets from the continuous strip in such manner that they fall behind the plates as they are tilted.

4. Apparatus for separating plates of glass stacked in face to face contact, comprising means to support the sheets in stacked relation upon their edges in upwardly inclined position, means consecutively to engage the bottom edges of the plates to lift the latter and means to engage the top edges thereof and tilt them forwardly.

5. Apparatus as defined in claim 4 in which means is further provided to deposit a sheet of paper behind each sheet of glass as it is tilted.

6. Apparatus as defined in claim 4 in which means is further provided to deposit a sheet of paper behind each sheet of glass as it is tilted, said means comprising shears to cut portions of paper from a continuous strip and drop the severed portions between the plates.

7. Apparatus as defined in claim 4 in which the means to lift the plates comprises a member rotating about a horizontal axis adjacent to the bottom edges of the plates and carrying a lug disposed to engage said edges.

8. Apparatus as defined in claim 4 in which the means to lift the glass plates comprises a horizontal roller carrying a lug disposed to engage the edges of the plates as the roller rotates.

9. Apparatus for separating glass plates stacked in face to face contact, comprising a platform for supporting the plates upon their edges in an upwardly inclined position, means consecutively to engage and lift the bottom edges of the plates, means to engage the top edges of the plates as they are lifted and tilt them forward, and feeder mechanism to advance the platform as each plate is tilted.

10. Apparatus as defined in claim 9 in which mechanism is provided to feed a sheet of paper behind each plate of glass as it is tilted.

11. Apparatus as defined in claim 9 in which mechanism is provided to feed a sheet of paper behind each plate of glass as it is tilted, said mechanism comprising means to feed a strip of paper and a shear to cut off a portion of the paper and to drop it behind the forwardly tilted plate.

12. Mechanism consecutively to separate plates of glass stacked in face to face contact, comprising an endless conveyor, a block mounted upon the conveyor to support the plates upon their edges in upwardly and rearwardly inclined position, a second block upon the conveyor in advance of the plates, and means to tilt the plates forwardly to rest against the latter block.

13. Mechanism consecutively to separate plates of glass stacked in face to face contact, comprising an endless conveyor, a block mounted upon the conveyor to support the plates upon their edges in upwardly and rearwardly inclined position, a second block upon the conveyor in advance of the plates, and means to tilt the plates forwardly to rest against the latter block, and means to drop a sheet of paper behind each plate after it is tilted.

14. Mechanism consecutively to separate plates of glass stacked in face to face contact, comprising an endless conveyor, a block mounted upon the conveyor to support the plates upon their edges in upwardly and rearwardly inclined position, a second block upon the conveyor in advance of the plates, and means to tilt the plates forwardly to rest against the latter block, said means to tilt the plates comprising a reciprocating label magazine interconnected with the conveyor to oscillate as each plate is advanced, and carrying gummed labels so stacked that the back of the forward label engages the rear faces of the glass plates and a device to moisten the labels prior to contact with the glass.

15. Mechanism consecutively to separate plates of glass stacked in face to face contact, comprising an endless conveyor, a block mounted upon the conveyor to support the plates upon their edges in upwardly and rearwardly inclined position, a second block upon the conveyor in advance of the plates, and means to tilt the plates forwardly to rest against the latter block, said means to tilt the plates comprising a reciprocating label magazine interconnected with the conveyor to oscillate as each plate is advanced, and carrying gummed labels so stacked that the back of the forward label engages the rear faces of the glass plates and a device to moisten the labels prior to contact with the glass, and means to drop a sheet of paper back of each plate of glass.

16. Apparatus simultaneously to separate plates of glass stacked in face to face contact and insert sheets of paper therebetween comprising a horizontal driven roller having a flute thereupon, a horizontal conveyor disposed adjacent to the roller in position to support the plates upon their edge in upwardly inclined position with the lower edge of each plate, disposed in the path of the flute as the roller revolves, means to advance the conveyor a distance equal to the horizontal distance through each plate, with each revolution of the roller, means to engage the upper edge of each plate while it is engaged by the flute to tilt the plate and means to insert a sheet of paper behind each plate after it is tilted.

17. Apparatus consecutively to separate a series of plate-like objects stacked in face to face relation and simultaneously to insert film-like bodies therebetween, comprising a platform, a support mounted upon the platform, said support having an upwardly and rearwardly inclined forward surface against which the plates recline with their lower edges resting upon the platform, a second support having an upwardly and forwardly inclined rear surface for receiving plates from the first support, means to tilt plates upon the first support forwardly against the latter support, means relatively to feed the platform forwardly, an increment corresponding to the thickness of the objects after each plate has been tilted, and means to insert a thin film-like body behind each plate after it is tilted.

WILLIAM OWEN.